United States Patent Office 3,335,251
Patented Aug. 8, 1967

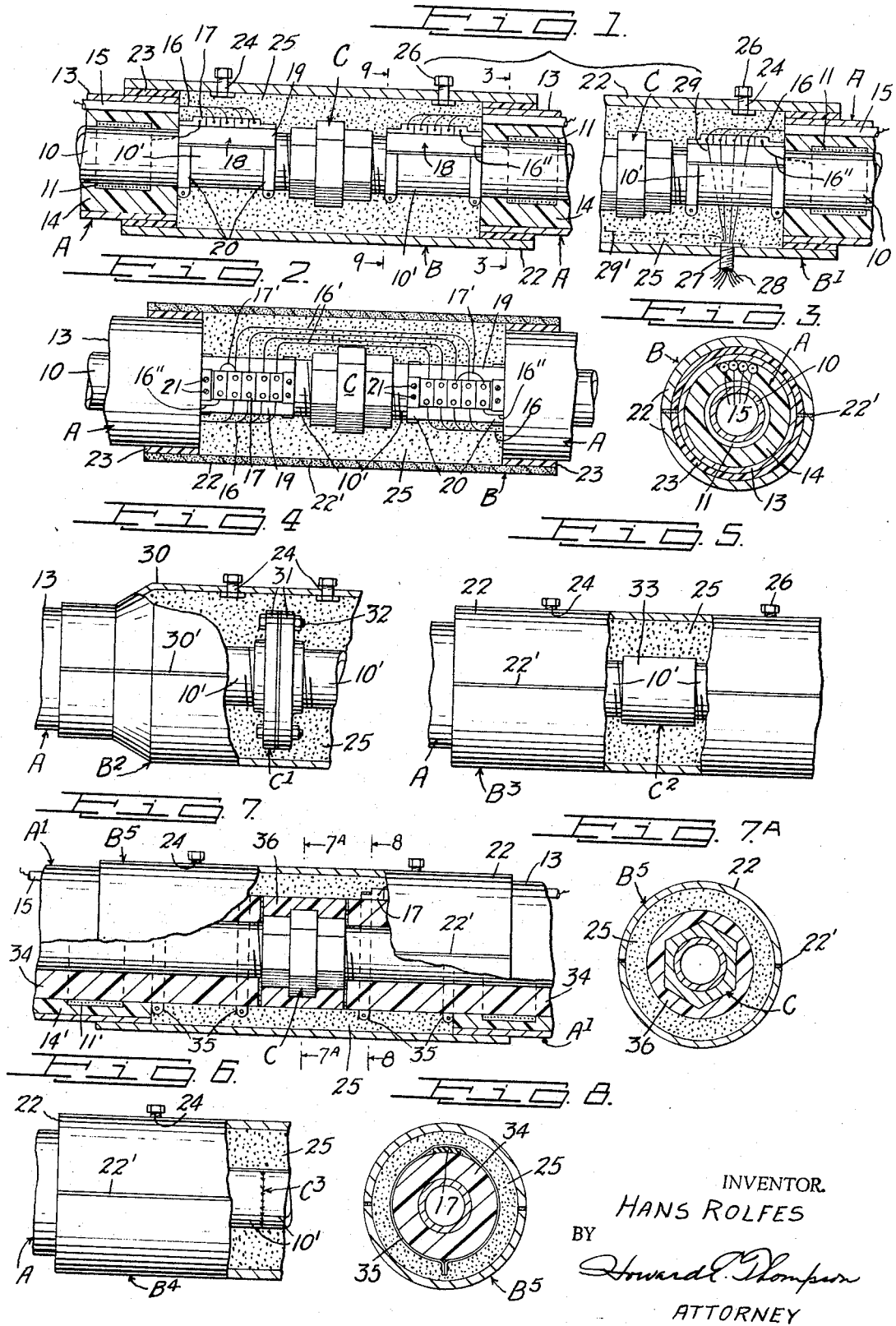

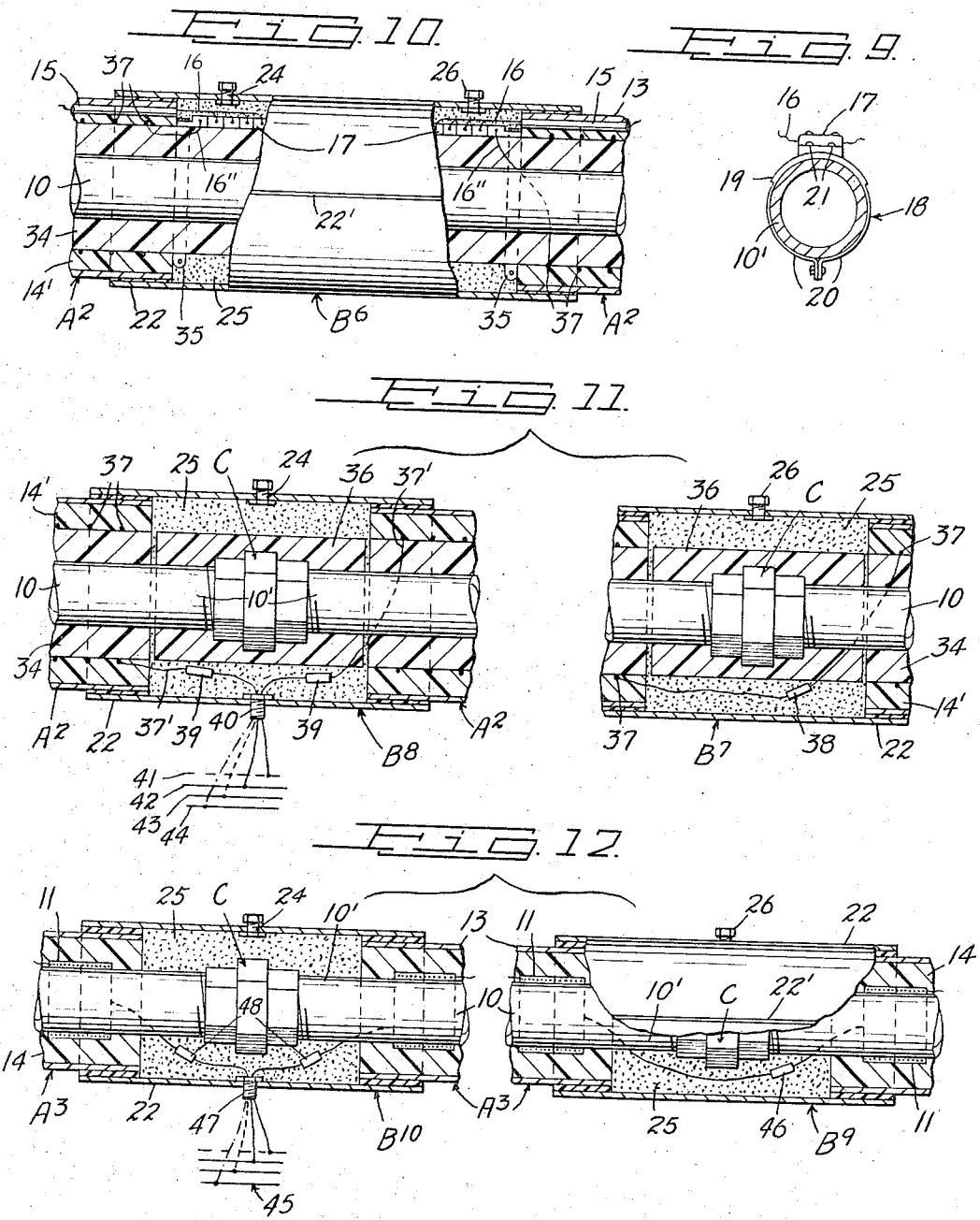

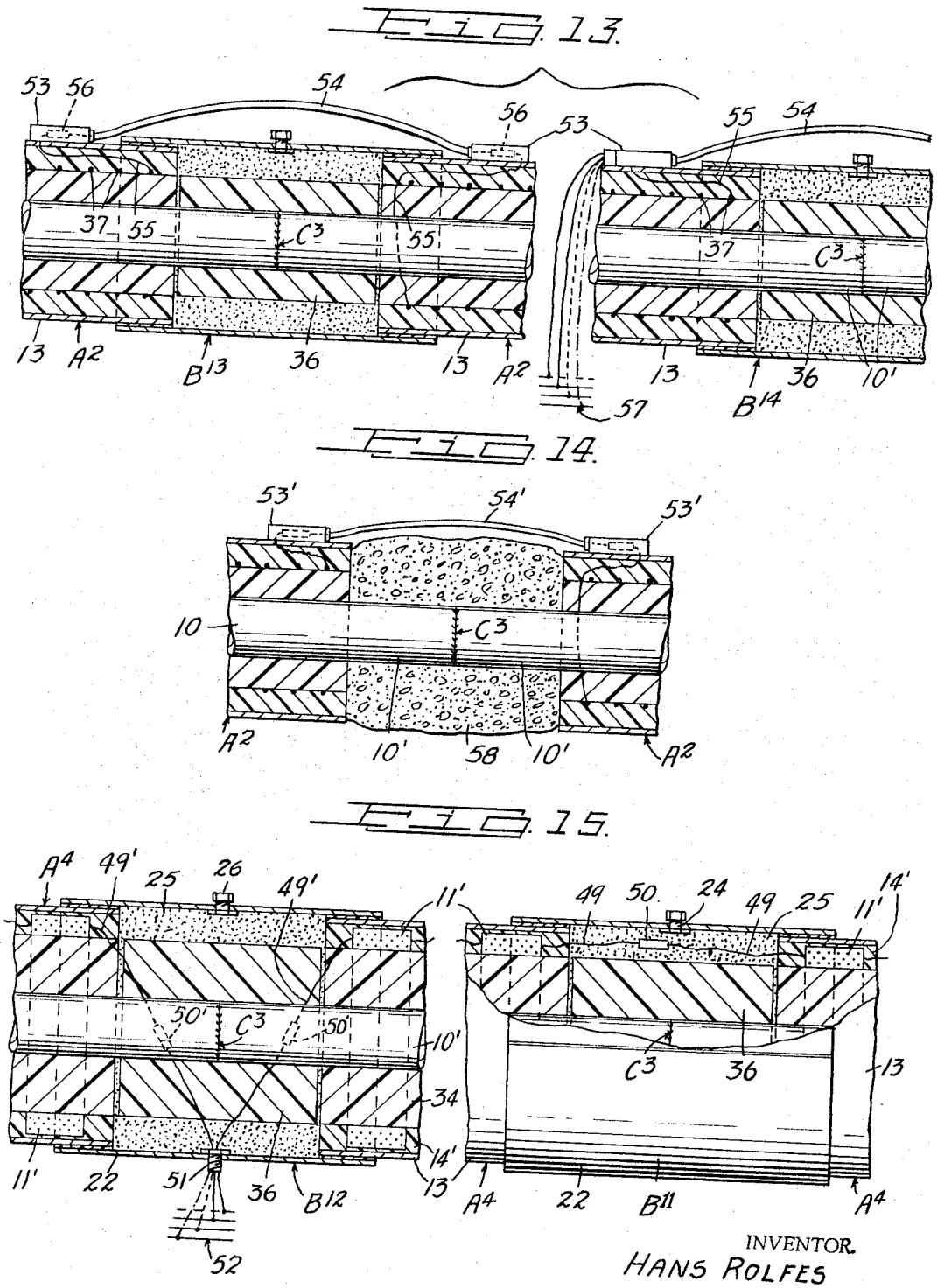

3,335,251
INDUCTION HEATING SYSTEM FOR ELONGATED PIPES
Hans Rolfes, Bronx, N.Y., assignor to Trans Continental Electronics Corp., New York, N.Y., a corporation of New Jersey
Filed Sept. 21, 1964, Ser. No. 397,865
15 Claims. (Cl. 219—10.51)

This application is a continuation-in-part of a companion application bearing Ser. No. 397,866, filed Sept. 21, 1964.

This invention relates to heating of pipes or fluid mediums passing therethrough in controlling the temperature of such mediums. More particularly, the invention deals in induction heating systems employing preformed heating units which include the pipe for circulation of the fluid medium, these units being of predetermined length and ends of adjacent heating units are coupled by coupling units facilitating quick and economical uniting of a multiplicity of the heating units in installation of a system. Still more particularly, the invention deals with systems of the character defined, wherein the coupling units of the heating system are arranged at couplings provided between ends of the pipes of the heating units and, further, wherein the source of electric supply to the heating units can couple with the system at predetermined spaced coupling units.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a bracketed diagrammatic sectional view showing spaced connector units of an induction heating system, with parts of the construction shown in elevation.

FIG. 2 is a plan and sectional view of the showing at the left of FIG. 1, diagrammatically illustrating the circuit connections between adjacent heating units within a coupling unit.

FIG. 3 is a section on the line 3—3 of FIG. 1.

FIG. 4 is a view, similar to FIG. 1, showing a modified form of pipe coupling within a modified form of unit.

FIG. 5 is a view, similar to FIG. 1, showing a modified form of pipe coupling, most of the coupling unit being shown in elevation.

FIG. 6 is a partial view, similar to FIG. 5, showing a further method of joining pipe ends of the heating units.

FIG. 7 is a view, similar to FIG. 1, showing a modified form of heating units.

FIG. 7A is a section on the line 7A—7A of FIG. 7.

FIG. 8 is a section on the line 8—8 of FIG. 7.

FIG. 9 is a section on the line 9—9 of FIG. 1 showing only part of the construction.

FIG. 10 is a sectional view, generally similar to FIG. 7, but showing a modified form of heating element in the heating units.

FIG. 11 is a bracketed sectional view illustrating a modified form of coupling unit as applied to a slightly modified form of heating unit from that shown in FIG. 10.

FIG. 12 is a bracketed view illustrating another modified form of heating units and coupling units.

FIG. 13 is a bracketed view showing another modification of heating units and coupling units.

FIG. 14 is a sectional view, similar to the left-hand showing of FIG. 13, of another form of construction; and FIG. 15 is a bracketed view illustrating a modified form of heating and coupling units.

With all of the induction heating systems disclosed, preformed heating units are employed, each unit including a fluid circulating pipe or the like to be heated and the pipes of adjacent units are joined by suitable couplings arranged within coupling units. Further, predetermined spaced coupling units include means for introducing circuit wires from a power source.

In the several systems, like references will designate like parts, except where modified for purposes of distinction.

Turning now to FIGS. 1 to 3 and 9, here is illustrated one system and at A are shown the heating units, B, B¹ the coupling units and at C the pipe coupling of the heating units within the coupling units B, B¹. Each unit A includes a fluid circulating pipe 10 and at 11 is shown the induction heating coils and at 12 are the circuit wires connecting the coils within each unit A. At 13 is disclosed the outer casing of the units, within which is a body of insulating material 14, within which are embedded conduits or ducts for the electric power supply, the wires 16 of which extend tto and are coupled with terminal blocks 17 mounted on protruding ends 10' of the pipes 10. This mounting is through the medium of a strap member 18 comprising a curved plate 19 having end straps 20. It will appear that the blocks 17 are fixed to plates 19 by screws 21. Note FIGS. 2 and 9.

In assemblage of the units A, 10 are coupled by coupling C which, in FIGS. 1 and 2, is a pipe union. Then conductors 16 of one unit are coupled with those of the adjacent unit by wires, as at 16' in FIG. 2 of the drawing. Also jumpers 17' are employed to complete circuits to end heating coils 11 through wires 16''. In completing the coupling unit B, a split sleeve 22, having split filler rings 23 at ends thereof, is employed and mounted on the assembly for completion of coupling units B, B¹. Adjacent ends of sleeves 22 are cemented or welded, as seen, for example, at 22' in FIG. 3 and in sectional stippling in FIG. 2. The sleeves 2 include spaced nipples 24 welded thereto for insertion of foamed insulating material 25 into the coupling units B, B¹ to provide sealed joints. Caps 26 are mounted on the nipples 24 in sealing outer ends of the nipples.

At this time, reference will be made to types of materials which can be employed in the several parts referred to of the heating units and coupling units and this would be the same throughout the several systems shown, except where modified structures are employed. The pipes 10 are composed of electrically conductive material and are preferably made of ferromagnetic material. The casings 12 provide a waterproof mechanical protection and can be formed of extruded polyvinylchloride. This also applies to the split sleeves 22. The insulation 14 is preferably polyurethane applied in the production of the units A and the seal at 25, which is poured or injected at the field of installation, is composed of the same material but, in distinguishing the field poured from the predetermined insulating material, the material 25 has been shown as a stippling. It is also preferred that the material employed in the rings 23 will be the same as the material employed in the installation 14.

The coupling B¹ differs from the coupling B by including an additional nipple, as at 27, through which circuit wires 28 from an external source can be periodically introduced into the system and, in the illustration at the right of FIG. 1, the wires extending to one of the blocks 17, shown at 29, and the dot-dash lines, at 29', indicate extension of the four wires to the associated block, which is not shown to simplify this illustration. It will be understood, in this connection, that the coupling unit B¹ is otherwise identical to the coupling unit B, shown in detail at the left of FIG. 1.

In FIGS. 4, 5 and 6 of the drawing, I have illustrated diagrammatically a modified form of couplings. In FIG. 4, the coupling is designated at C¹ and is arranged in a modified form of split sleeve 30, identified by the coupling unit B². Within the sleeve, the pipes 10 are coupled by flanges secured to the pipe ends 10′, the flanges being secured together by bolts 32. Otherwise, the illustration in FIG. 4 is identical with the showing in FIG. 1 and the weld between the sleeve halves is diagrammatically illustrated at 30′.

In FIGS. 5 of the drawing, the coupling of the pipe ends 10′ is through the medium of a nipple 33 in defining the coupling $C^2$. Here again, the structure of the coupling unit is identical with that shown in FIG. 1.

In FIG. 6 of the drawing, the coupling of the pipe ends 10′ is by means of welding, as indicated by the coupling $C^3$ and, again, this structure is otherwise the same as that shown in FIG. 1.

In FIGS. 5 and 6, the split sleeves defining the coupling units are identified by the reference characters $B^3$ and $B^4$.

In FIGS. 7, 7A and 8 is shown another modified form of system employing heating units $A^1$, which differ slightly from the units shown in FIG. 1 of the drawing, and at $B^5$ is shown the coupling unit employed. The units $A^1$ differ from the units A in employing rigid high temperature insulation 34 arranged directly upon the pipes 10 and projecting onto part of the ends of the pipes 10 which extend beyond the casing 13. Fixed to the pipe ends are couplings C identical with that shown in FIG. 1. The coils 11′ are mounted on the insulation 34 instead of being arranged directly upon the pipes 10 and the outer insulation 14′ is arranged upon the insulation 34 and the coils 11′, as noted. It will be noted that 14′ terminates at the end of the casing 13 so as to provide for the mounting of the terminal blocks directly thereon, as by straps 35, similar to the mounting of the blocks on the pipe in FIG. 1 by the straps 20. For this reason, no detail showing of the blocks is deemed to be necessary in FIG. 7. The strap mounting 35 is diagrammatically shown in FIG. 8 of the drawing. The coupling $B^5$ includes a split sleeve 22, similar to the sleeve shown in FIG. 1, and within the sleeve the coupling C is contained within an insulating enclosure ring 36 which is applied to C prior to the assemblage of the split sleeve 22 and the ring 36 is shown in section in FIG. 7A of the drawing and, after the completion of the assemblage, the insulating material 25 is injected through the nipples 24.

It will also be understood that end portions of the sleeve 22 can be cemented or otherwise secured to the ends of casing 13.

FIG. 10 modified the showing in FIG. 7 in substituting for the coil 11′ a wire heating element 37 coiled about the insulation 34 in forming heating units $A^2$. In this construction, the conduits or ducts 15 extend to the blocks 17, as in FIG. 1 of the drawing and as partially indicated in FIG. 10. No specific showing of the coupling within the coupling element $B^6$ is made, as any one of the couplings as shown in FIGS. 1, 5 and 6 could be employed. Otherwise, the structure of FIG. 10 is generally similar to FIG. 7 with the blocks 17 mounted on the protruding ends of 34.

Turning now to the system as shown in FIG. 11, this modifies the showing of FIG. 10 in the direct coupling of ends of the coils 37 as at 38 at the right of FIG. 11 within the coupling unit $B^7$; whereas, in the unit $B^8$ electric power supply is connected to the ends 37′ of 37, as indicated at 39. The unit $B^8$ also includes a nipple 40 for transmission of circuit wires to 39 from external power supply sources as by wires 41, 42, 43 and 44, having different power phases extending substantially from the normal or medium source of supply at 41 to successively higher phases 42, 43 and 44 for proper transmission of heat through an extremely long system.

It will be noted upon a consideration of FIG. 11 that insulation 34 stops at the end of the casing 13 and the insulation 36 applied over the couplings C extends to the ends of 34.

Considering FIG. 12 of the drawing, in this figure, heating elements $A^3$ are employed and are coupled by coupling units $B^9$ and $B^{10}$. This structure differs from the showing in FIGS. 1 and 2 first by employing the external source of power supply, as at 45, similar to 41–44 and in connecting the heating coils 11 directly with each other, as at 46 in coupling unit $B^9$. Also the power supply 45 extends to adjacent ends of units $A^3$, $A^3$ through nipple 47 and connected, as at 48 within $B^{10}$. Otherwise, the structure of FIG. 12 is the same as in FIG. 1 and employs a coupling C between the ends of the pipes 10.

Considering, at this time, FIG. 15 of the drawing, here is disclosed what might be termed a high temperature variation over the showing in FIG. 12. In this figure, $A^4$, $A^4$ show the heating units and $B^{11}$ and $B^{12}$ show the coupling units. The units $A^4$ include insulations 34 arranged directly on the pipes 10, as in FIG. 11, with insulation 36 arranged on coupling $C^3$, a weld similar to the showing in FIG. 6 of the drawing. At 14′ is shown an insulation arranged upon 34, as in FIG. 11. In FIG. 15, high temperature coils 11′ are mounted on the insulation 34 and wires 49 of 11′ are coupled, as at 50 in the unit $B^{11}$.

Considering unit $B^{12}$, it will appear that a nipple 51 is employed, so that the wires passing through the nipple can extend to the outer source of current supply, as at 52, again, the same as the showing at 41 to 44, inclusive, in FIG. 11 of the drawing. Wires 49′ extending to 52 have couplings, as at 50′.

In FIGS. 13 and 14, I have shown different systems employing connection of the power supply with the heating units $A^2$, $A^2$, as shown in FIG. 11, and the coupling units $B^{13}$, $B^{14}$ of FIG. 13 are generally similar to the units $B^{12}$ of FIG. 15. In FIG. 13, electric boxes 53 are cemented or otherwise fixed to adjacent end portions of the casings 13. These boxes are joined by outer cables 54 extending across or bridging $B^{13}$, $B^{14}$. Wires 55 from the ends of coils 31 extend through the casings 13 and are coupled with the boxes 53 or wire connectors 56 in said boxes, as indicated in dotted lines.

At the right of FIG. 13 is shown diagrammatically at 57 the outer source of current supply extending to boxes 53 adjacent the units $B^{14}$. Here again, the source of supply 57 is similar to the wires 41–44 of FIG. 11 of the drawing.

In FIG. 13, the pipe couplings $C^3$ are arranged within insulations, similar to 36 in FIG. 11. In connection with FIG. 13, as well as FIG. 14, it will be understood that any of the other types of couplings C, $C^1$ and $C^2$ can be employed with appropriate changes in the coupling units, particularly when couplings $C^1$ are employed.

In FIG. 14, the bridging of the circuit between the ends of the heating units $A^2$ is the same as that shown in FIG. 13, as well as in the connection of the coils 37 with the boxes as at 53′. However, instead of employing the usual split sleeve, the final closure of couplings $C^3$ is accomplished by manually or otherwise applying a foamed sealing body 58 around the protruding ends 10′ of the pipes 10 between the spaced ends of the units $A^2$, $A^2$, as diagrammatically shown. Application of 58 can be performed before or after the cable 54′ is coupled with the boxes 53′. In the system as shown in FIG. 14, no illustration has been made of the introduction of the power supply, as at 57 in FIG. 13, but it will be understood that at predetermined intervals such a coupling will be made. However, it is not deemed necessary to further illustrate this phase of the structure shown in FIG. 4.

With the present construction, prefabricated heating units with the circulating pipe therein and constituting a part thereof facilitate field installation of a complete system. This arrangement would be practical in initially laying the liquid circulating pipe. By providing pre-formed assemblages of this type and kind, complete installation can be economically performed, as well as the provision of a control for laying or positioning the liquid circulating pipe.

With systems as shown in FIG. 15, induction heating of circulating pipe is at high temperatures. To dissipate the generated heat in the induction heating coils more effectively, the coils are placed adjacent the casing 13 to take advantage of the ambient air or soil temperature.

In the several illustrations, the insulation within the coupling units, or at least the part thereof inserted into the sleeves of coupling units, is stippled to distinguish this field inserted insulation from that employed in the pre-formed heating units.

The pipes of the various systems will be modified in characteristics in handling different temperatures; for example, polyvinylchloride can be used with temperatures up to 130° F.; whereas, when temperatures rise to approximately 250° F., the pipe can be composed of epoxy and, when the temperature extends to 450° F., asbestos pipes can be employed and, with still higher temperatures, ceramic pipes will be preferred.

It will also be apparent that different circuits are picked up at spaced couplings by means of the jumpers 17′, as illustrated in FIG. 2 of the drawing, to care for heating the coils in long lengths of pipes. With the structure shown in FIGS. 1 to 3, inclusive, for example, the source of supply is contained within the system and the initial coupling with an external source, as at 27, 28, FIG. 1, would be at widely spaced intervals. With the illustrations, as, for example, in FIGS. 11 and 12, the source of supply is external of the system and the heating coils will be coupled with the source of supply, as at 41–44, and also as shown at 45, the four wires being equivalent to the four conductors 15, as illustrated in FIG. 3 of the drawing.

Having fully described my invention, what I claim as new and desire to secure by Letters Patent is:

1. In an induction heating system for heating an elongated pipe structure, said system comprising coupled insulated electric heating units, each unit being pre-formed and comprising a pipe, insulation on said pipe, an outer casing on said insulation and electric heating means including a source of electric supply arranged longitudinally of said pipe and casing, the pipe having ends projecting at ends of each unit, means for joining the pipe ends of adjacent units at coupling units defined by split sleeves and insulation within said sleeves, means for coupling the heating means at part of said coupling units, and means at predetermined coupling units for introducing different power phases of current supply.

2. A system as defined in claim 1, wherein the heating means comprises electrically coupled heating coils spaced longitudinally on said pipe.

3. A system as defined in claim 1, wherein insulation of said unit comprises inner and outer insulations of different characteristics, and said heating means comprising electrically coupled heating coils spaced longitudinally of said inner insulation.

4. A system as defined in claim 1, wherein insulation of said unit comprises inner and outer insulations of different characteristics, and said heating means being arranged on said inner insulation.

5. A system as defined in claim 1, wherein insulation of said unit comprises inner and outer insulations of different characteristics, and said heating means comprising a wound electric heating coil arranged on said inner insulation.

6. A system as defined in claim 1, wherein said source of electric supply comprises conduits arranged in each of said heating units.

7. A system as defined in claim 1, wherein said third named means includes terminal blocks mounted on said pipe ends.

8. A system as defined in claim 1, wherein said third named means includes terminal blocks mounted on projecting ends of said inner insulation.

9. A system as defined in claim 1, wherein said source of electric supply comprises conduits extending longitudinally of said casing, and said third named means joining the conduits at said part of the coupling units.

10. A system as defined in claim 1, wherein the heating means comprises a wound electric heating coil, and said third named means being external of said coupling units.

11. A system as defined in claim 1, wherein said third named means is arranged externally of said coupling units.

12. A system as defined in claim 1, wherein the insulation within the split sleeves of the coupling units is added after the split sleeves have been attached.

13. An electric heating unit wherein assemblages of such units will produce an induction heating system of the character described, said unit comprising an elongated pipe, insulation on and extending the major portion of the length of said pipe, an elongated outer casing mounted directly on said casing and electric heating means including a portion of electric supply arranged longitudinally of said pipe and casing, and the pipe having projecting ends which project beyond the insulation at ends of the unit.

14. A unit as defined in claim 13, wherein the insulation of the unit comprises inner and outer insulations of different characteristics, and said inner insulation projecting beyond ends of the casing.

15. A unit as defined in claim 14, wherein said electric heating means is arranged upon said inner insulation.

References Cited
UNITED STATES PATENTS

| | | | |
|---|---|---|---|
| 2,178,721 | 11/1939 | Daniels | 219—10.51 X |
| 2,513,779 | 7/1950 | Bailey | 219—10.51 |
| 2,729,731 | 1/1956 | Kleinpeter | 219—10.51 |
| 2,888,541 | 5/1959 | Netzer | 219—10.79 X |
| 3,182,170 | 5/1965 | Rolfes | 219—10.79 |
| 3,265,851 | 8/1966 | Schroeder | 219—10.49 X |

RICHARD M. WOOD, *Primary Examiner.*

L. H. BENDER, *Assistant Examiner.*